E. E. HENRY.
SAW GRINDING MACHINE.
APPLICATION FILED NOV. 7, 1913.
1,146,705.
Patented July 13, 1915.
2 SHEETS—SHEET 1.
Fig. 1.
Fig. 2.
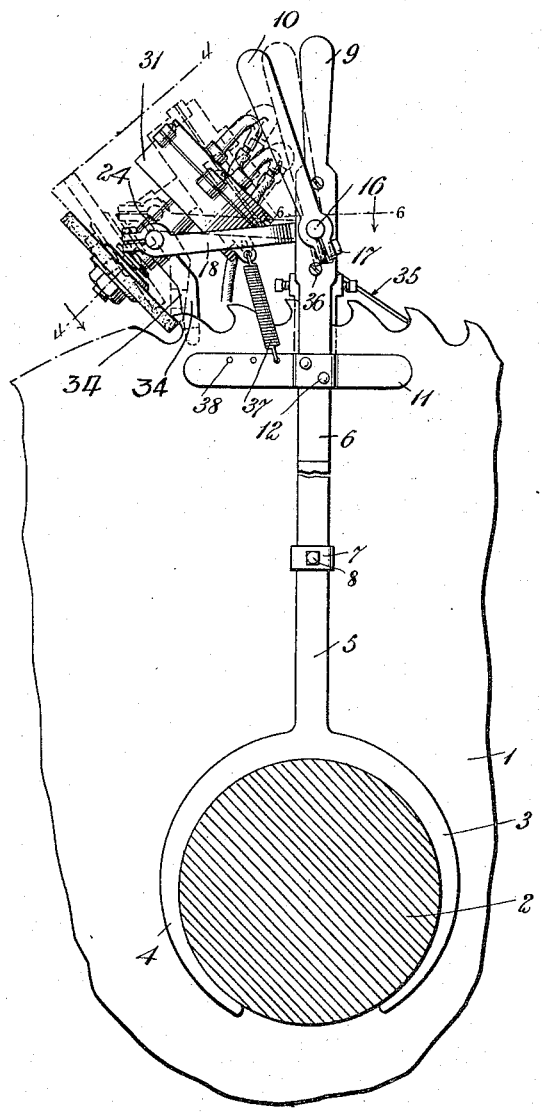
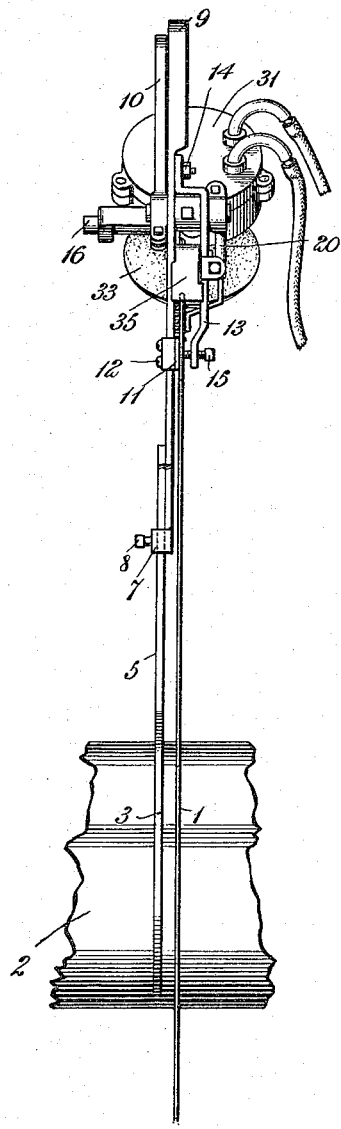
WITNESSES
INVENTOR
Eugene E. Henry
BY
ATTORNEYS

E. E. HENRY.
SAW GRINDING MACHINE.
APPLICATION FILED NOV. 7, 1913.

1,146,705.

Patented July 13, 1915.
2 SHEETS—SHEET 2.

WITNESSES

INVENTOR
Eugene E. Henry
BY
ATTORNEYS

UNITED STATES PATENT OFFICE.

EUGENE E. HENRY, OF ASTORIA, OREGON, ASSIGNOR OF ONE-HALF TO CHARLES DORAN, OF BELLINGHAM, WASHINGTON.

SAW-GRINDING MACHINE.

1,146,705.

Specification of Letters Patent.  Patented July 13, 1915.

Application filed November 7, 1913.  Serial No. 799,706.

*To all whom it may concern:*

Be it known that I, EUGENE E. HENRY, a citizen of the United States, and a resident of Astoria, in the county of Clatsop and State of Oregon, have invented a new and Improved Saw-Grinding Machine, of which the following is a full, clear, and exact description.

This invention relates to improvements in saw grinding machines, and has for an object to provide an improved structure which may be used for grinding or sharpening various kinds of saws.

Another object of the invention is to provide a saw grinding device which by a back and forth movement will feed the grinding device forward so that the same may be brought successively into engagement with the respective teeth of the saw.

A still further object of the invention is to provide a grinding device for swaged saws which may be applied to a saw without removing the same, and which will grind an inserted tooth equally with an original tooth.

In carrying out the object of the invention a rest or support is provided which partially surrounds the shaft carrying the saw. This support has guiding means connected therewith bearing against the saw so that the grinding mechanism arranged thereon will be properly centered. Pivotally connected to this support is an arm, which in turn supports an abrading member, and suitable means for connecting a source of power to the abrading member. Various power means may be used, as for instance a motor may be mounted upon the swinging arm.

Figure 3:
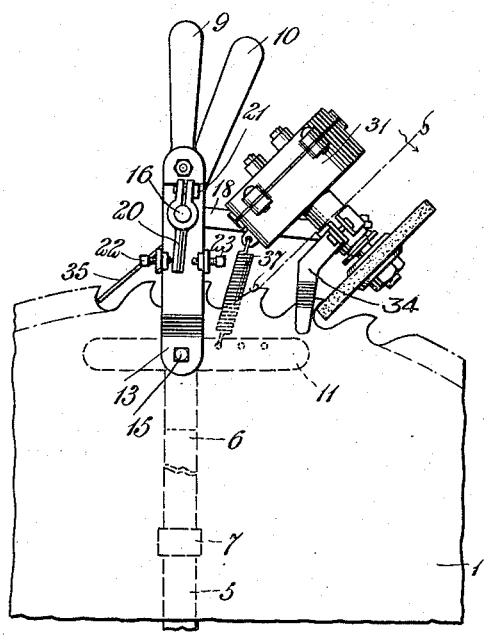
Figure 5:
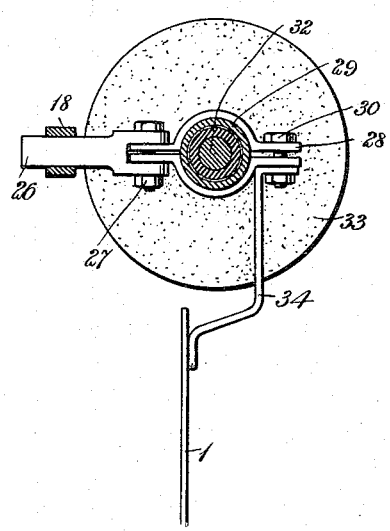
Figure 4:
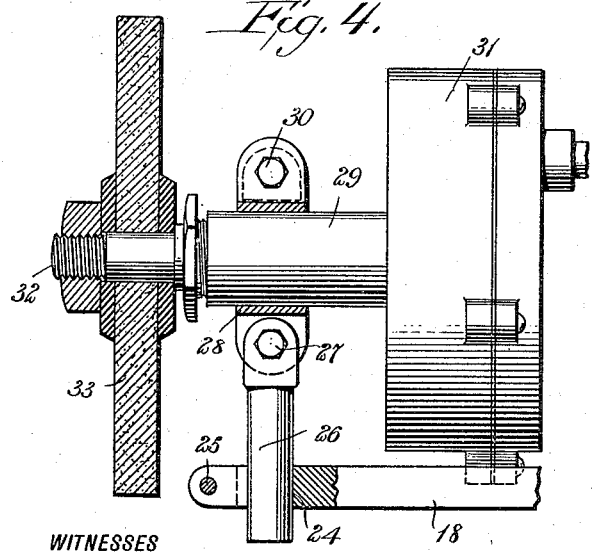
Figure 6:
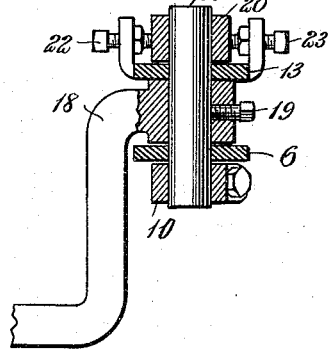

In the accompanying drawings—Figure 1 is a side view of a grinder embodying the invention, the same being shown applied; Fig. 2 is an edge view of the structure shown in Fig. 1; Fig. 3 is a view of the upper part of the structure shown in Fig. 1 looking from the opposite side; Fig. 4 is a section through Fig. 1 approximately on line 4—4; Fig. 5 is a section through Fig. 3 on line 5—5; Fig. 6 is a section through Fig. 1 on line 6—6.

Referring to the accompanying drawings by numeral 1 indicates a saw which may be of any desired kind, as for instance a swaged tooth saw. This saw is mounted upon a suitable shaft 2 over which the arms 3 and 4 are passed. The arms 3 and 4 are preferably formed integral with a support having a stationary section 5 to which is adjustably connected a section 6. Supporting section 6 is provided with a looped portion 7 accommodating set screw 8 adapted to clamp against a stationary section 5 so as to adjustably hold the adjustable section 6 properly in place, as shown in Fig. 1. The section 6 extends beyond the periphery of saw 1, and is formed with an operating grip or handle portion 9 co-acting with a lever 10 when the machine is in operation. Arranged on section 6 near the periphery of saw 1 is a grinding bar 11 held in place by suitable clamping members 12 which may be screws or other means, as desired. This bar 11 engages saw 1 and spaces the section 6 a predetermined distance therefrom. Arranged on the opposite side of the saw 1 to the bar 11 is a guiding arm 13 secured to standard 6 by any suitable means, as for instance bolt 14. The lower end of the arm 13 carries an adjustable screw 15 which may be adjusted so as to prevent any material loose motion between the bar 11 and saw 1, and thereby properly hold the grinding device, hereinafter fully described, in position to act correctly on the teeth of the saw.

The adjustable section 6 carries a shaft 16 which is rotatably mounted in the section 6, as clearly shown in Fig. 6, and which carries at one end the lever 10 clamped thereto by a suitable clamping screw 17. Near the opposite end to that carrying lever 10 is a supporting arm 18 preferably rigidly connected with shaft 16, as for instance by a set screw 19. Also mounted on shaft 16 is a stop arm 20 shown more clearly in Fig. 3. This stop arm is rigidly clamped to shaft 16 by a suitable clamping bolt 21, the arm being suitably bifurcated for allowing this clamping action. The arm 20 extends outwardly between the adjustable stops 22 and 23, whereby the rocking movement of shaft 16 is limited by the position of the various set screws. As heretofore described arm 18 is rigidly clamped to shaft 16 so as to be moved therewith when lever 10 is moved.

This arm is formed with a journal box 24 at its outer end which is bifurcated, and which carries a clamping screw 25 so as to rigidly clamp the journal box 24 to the pivotal shaft 26. The shaft 26 is pivotally connected by a bolt 27 to the sleeve 28 in which is mounted a supporting tubular member 29. The sleeve 28 is rigidly clamped to member 29 by bolts 27 and 30 so that there is no rotation of tubular member 29. Tubular member 29 carries a motor 31 which may be any kind of a motor, as for instance, a water motor, steam, compressed air or electric, as desired. It will also be evident that other power means could be applied without departing from the spirit of the invention, as the specific structure of the motor forms no part of the grinder. By connecting arm 18, as just described, with tubular member 29, the tubular member 29 and parts carried thereby will be moved with arm 18 pivotally around shaft 16. The motor 31 carries a power shaft 32 extending through tubular member 29. On shaft 32 is arranged an abrading or grinding tool 33 which is adapted to engage the teeth of saw 1. Bolt 30 not only assists in clamping member 28 to tubular member 29, but also clamps the guiding member 34 (Figs. 3 and 5) rigidly in position so as to help guide the abrading member 33 in its movement. Also, in order that the abrading member 33 may properly act successively on the various teeth of the saw a feeding and spacing member 35 is provided which is pivotally mounted upon shaft 36. The member 35 is preferably freely journaled on member 36, and is made of a proper length for fitting into one of the rear teeth as the grinding stone or abrading member 33 fits into one of the forward teeth. After the abrading member 33 has performed its work the lever 10 is operated, as shown in dotted lines on Fig. 1 and then the entire device is moved until spacing member 35 engages the next tooth. After this has been done the lever 10 is released so that the spring 37 may actuate arm 18 for causing the abrading member 33 to engage the next tooth and grind the same. It will be observed from Fig. 1 that the spring 37 may be connected to bar 11 in any of the apertures 38, whereby the tension thereof may be varied.

In operation after the device has been placed in position, as shown in Fig. 1, lever 10 is moved substantially to the position shown in dotted lines in Fig. 1, and then the power is turned on for rotating the abrading member 33. The lever 10 is then released and grinds properly the tooth engaged thereby. After this has been done lever 10 is again moved until the abrading member 33 is disengaged, whereupon the entire device is rotated and moved forward so that the feeding device 35 may engage the next tooth. After the next tooth has been engaged by the feeding member the entire device and saw may be rotated, if desired, toward the operator, or the lever 10 may be released and allowed to grind in its new position. This action of advancing the abrading member is to be continued until all of the teeth have been properly ground. It will be noted also that by reason of the adjustability of the section 6 on the stationary section 5 the device may be used on saws of different diameters.

What I claim is:—

1. In a saw grinding device of the character described, a support provided with a stationary section adapted to engage and be supported by the shaft of the saw, and an adjustable section for accommodating the device to saws of different sizes, an abrading member, means for movably mounting said abrading member on said adjustable section whereby the abrading member may move into and out of engagement with the teeth of the saw associated with said support, and means associated with said support for feeding the support forward step by step.

2. In a device of the character described, a support provided with a stationary section adapted to engage and be supported by the shaft of a saw, an adjustable section for accommodating the device to saws of different sizes, an arm pivotally mounted on said adjustable section, means for rocking said arm, a tubular member rigidly secured to said arm, a rotatable shaft arranged on said tubular member and projecting therefrom, an abrading tool rigidly secured to said rotatable member, a motor carried by said tubular member, said motor being connected with said rotatable member for operating the same, adjustable means for limiting the swinging movement of said tool toward the saw, and means for causing a proper spacing of the saw teeth.

3. In a saw grinding device, a support provided with a stationary section adapted to engage and be supported by the shaft of the saw, and an adjustable section for accommodating the device to saws of different sizes, a guiding or positioning member for holding said support a predetermined distance from said saw, means co-acting with said guiding or positioning member for preventing a movement of the support in an opposite direction, a swinging arm arranged on said adjustable section, said swinging arm being formed with a grip designed to be engaged simultaneously with the engagement of said adjustable section for swinging said arm away from said saw, a casing arranged on said swinging arm, said casing accommodating a power member and an operating shaft connected with the power member, a grinding tool rigidly secured to said shaft for rotation thereby, a spring connected with said casing and with said guiding or positioning member for urging said swinging arm toward said saw, means associated with the arm for feeding said support forward regardless of the size of the teeth.

In testimony whereof I have signed my name to this specification in the presence of two subscribing witnesses.

EUGENE E. HENRY.

Witnesses:
JOHN HANSEN,
EMIL MAGNISEN.

Copies of this patent may be obtained for five cents each, by addressing the "Commissioner of Patents, Washington, D. C."